(12) United States Patent
Kobayashi

(10) Patent No.: US 12,143,241 B2
(45) Date of Patent: Nov. 12, 2024

(54) VEHICLE-MOUNTED APPARATUS AND A METHOD FOR RELAYING

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takuya Kobayashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/262,935

(22) PCT Filed: Jan. 14, 2022

(86) PCT No.: PCT/JP2022/001094
§ 371 (c)(1),
(2) Date: Jul. 26, 2023

(87) PCT Pub. No.: WO2022/163386
PCT Pub. Date: Aug. 4, 2022

(65) Prior Publication Data
US 2024/0089142 A1 Mar. 14, 2024

(30) Foreign Application Priority Data
Jan. 27, 2021 (JP) ................................ 2021-011343

(51) Int. Cl.
*H04L 12/40* (2006.01)
*H04L 12/54* (2022.01)
(Continued)

(52) U.S. Cl.
CPC .......... *H04L 12/40* (2013.01); *H04L 12/5601* (2013.01); *H04L 67/12* (2013.01);
(Continued)

(58) Field of Classification Search
CPC ..... H04L 12/40; H04L 12/5601; H04L 67/12; H04L 2012/40215; H04L 2012/40273; H04L 2012/562
(Continued)

(56) References Cited

U.S. PATENT DOCUMENTS

2005/0021860 A1* 1/2005 Kelly .................. H04L 12/4625
709/230
2007/0061631 A1* 3/2007 Nakamura .......... H04L 41/0663
714/43
(Continued)

FOREIGN PATENT DOCUMENTS

| JP | 2009-049944 A | 3/2009 |
|----|---------------|--------|
| JP | 2009-253464 A | 10/2009 |

(Continued)

OTHER PUBLICATIONS

International Search Report, Application No. PCT/JP2022/001094, mailed Feb. 22, 2022. ISA/Japan Patent Office.

*Primary Examiner* — Wing F Chan
*Assistant Examiner* — Leon Y Tseng
(74) *Attorney, Agent, or Firm* — Honigman LLP

(57) ABSTRACT

A vehicle-mounted apparatus includes a first processing unit that is connected to each of the plurality of vehicle-mounted ECUs and performs relay processing on the messages; a second processing unit that is connected to each of the plurality of vehicle-mounted ECUs and performs relay processing on the messages; a first routing table including a relay destination of each message to be processed at the first processing unit; and a second routing table including a relay
(Continued)

destination of each message to be processed at the second processing unit. Each of the first processing unit and the second processing unit includes a connection unit to which wiring connected to the plurality of vehicle-mounted ECUs is connected, the first processing unit performs the relay processing based on the first routing table, and the second processing unit performs the relay processing based on the second routing table.

7 Claims, 9 Drawing Sheets

(51) Int. Cl.
    *H04L 67/12*     (2022.01)
    *H04L 12/70*     (2013.01)
(52) U.S. Cl.
    CPC ............... *H04L 2012/40215* (2013.01); *H04L 2012/40273* (2013.01); *H04L 2012/562* (2013.01)

(58) Field of Classification Search
    USPC .......................................................... 709/224
    See application file for complete search history.

(56) References Cited

U.S. PATENT DOCUMENTS

| | | |
|---|---|---|
| 2017/0277566 A1 | 9/2017 | Okamoto et al. |
| 2020/0204397 A1 | 6/2020 | Inoue |
| 2021/0250200 A1* | 8/2021 | Kaneko ................... H04L 12/66 |

FOREIGN PATENT DOCUMENTS

| | | |
|---|---|---|
| JP | 2010-251837 A | 11/2010 |
| JP | 2018-095037 A | 6/2018 |

* cited by examiner

FIG. 4

Legend:

A= Relay destination

Rule table

| Message | A | Message type |
|---|---|---|
| XXXXXXXXXXXXXXXX | XXX | High-priority control message |
| XXXXXXXXXXXXXXXX | XXX | High-priority control message |
| . | . | . |
| . | . | . |
| . | . | . |

FIG. 5

First table

| Message | A | Message type | Priority |
|---|---|---|---|
| XXXXXXXXXXXXXXXX | XXX | Low-priority control message | Low |
| XXXXXXXXXXXXXXXX | XXX | Low-priority control message | Low |
| . | . | . | . |
| . | . | . | . |
| . | . | . | . |

FIG. 6

Legend:

A= Relay destination

Third table

| Message | A | Message type | Priority |
|---|---|---|---|
| XXXXXXXXXXXXXXXX | XXX | Low-priority control message | Low |
| XXXXXXXXXXXXXXXX | XXX | Low-priority control message | Low |
| . | . | . | . |
| . | . | . | . |
| . | . | . | . |
| XXXXXXXXXXXXXXXX | XXX | Diagnostic message | Low |
| XXXXXXXXXXXXXXXX | XXX | Diagnostic message | Low |
| . | . | . | . |
| . | . | . | . |
| . | . | . | . |

FIG. 8

Legend:

A= Relay destination

Second table

| Message | A | Message type | Priority |
|---|---|---|---|
| XXXXXXXXXXXXXXXX | XXX | Diagnostic message | Low |
| XXXXXXXXXXXXXXXX | XXX | Diagnostic message | Low |
| . | . | . | . |
| . | . | . | . |
| . | . | . | . |

FIG. 9

Fourth table

| Message | A | Message type | Priority |
|---|---|---|---|
| XXXXXXXXXXXXXXXX | XXX | High-priority control message | High |
| XXXXXXXXXXXXXXXX | XXX | High-priority control message | High |
| . | . | . | . |
| . | . | . | . |
| . | . | . | . |
| XXXXXXXXXXXXXXXX | XXX | Low-priority control message | Low |
| XXXXXXXXXXXXXXXX | XXX | Low-priority control message | Low |
| . | . | . | . |
| . | . | . | . |
| . | . | . | . |
| XXXXXXXXXXXXXXXX | XXX | Diagnostic message | Low |
| XXXXXXXXXXXXXXXX | XXX | Diagnostic message | Low |
| . | . | . | . |
| . | . | . | . |
| . | . | . | . |

VEHICLE-MOUNTED APPARATUS AND A METHOD FOR RELAYING

CROSS-REFERENCE TO RELATED APPLICATIONS

This application is the U.S. national stage of PCT/JP2022/001094 filed on Jan. 14, 2022, which claims priority of Japanese Patent Application No. JP 2021-011343 filed on Jan. 27, 2021, the contents of which are incorporated herein.

TECHNICAL FIELD

The present disclosure relates to a vehicle-mounted apparatus and a method for relaying.

BACKGROUND

A plurality of vehicle-mounted ECUs (Electronic Control Units) are mounted in a vehicle to control vehicle-mounted equipment, such as power train equipment that controls the engine or the like and body-related equipment that controls an air conditioner or the like. Such plurality of vehicle-mounted ECUs are connected to a vehicle-mounted apparatus. The vehicle-mounted apparatus performs processing to control the vehicle-mounted equipment, such as relay processing for communication between vehicle-mounted ECUs (see, for example, JP 2017-171114A).

In the vehicle-mounted apparatus according to JP 2017-171114A, processing, such as relay processing of communication, is concentrated. However, the vehicle-mounted apparatus described above does not consider the consequences of processing being concentrated.

The present disclosure was conceived in view of the above circumstances and has an object of providing a vehicle-mounted apparatus and the like that are capable of executing relay processing efficiently, even when processing is concentrated.

SUMMARY

A vehicle-mounted apparatus according to one aspect of the present disclosure is a vehicle-mounted apparatus that is connected to a plurality of vehicle-mounted ECUs, relays messages output by the plurality of vehicle-mounted ECUs, and includes: a first processing unit for performing relay processing on the messages, the first processing unit being connected to each of the plurality of vehicle-mounted ECUs; a second processing unit for performing relay processing on the messages, the second processing unit being connected to each of the plurality of vehicle-mounted ECUs; a first routing table including a relay destination of each message to be processed at the first processing unit; and a second routing table including a relay destination of each message to be processed at the second processing unit, wherein each of the first processing unit and the second processing unit includes a connection unit to which wiring connected to the plurality of vehicle-mounted ECUs is connected, the first processing unit performs the relay processing based on the first routing table, and the second processing unit performs the relay processing based on the second routing table.

Advantageous Effects

According to one aspect of the present disclosure, it is possible to execute relay processing efficiently, even when processing is concentrated.

BRIEF DESCRIPTION OF DRAWINGS

FIG. 4 is a conceptual diagram depicting an example content of a rule table.

FIG. 5 is a conceptual diagram depicting an example content of a first table.

FIG. 6 is a conceptual diagram depicting an example content of a third table.

FIG. 8 is a conceptual diagram depicting an example content of a second table.

FIG. 9 is a conceptual diagram depicting an example content of a fourth table.

DETAILED DESCRIPTION OF PREFERRED EMBODIMENTS

Figure 1:
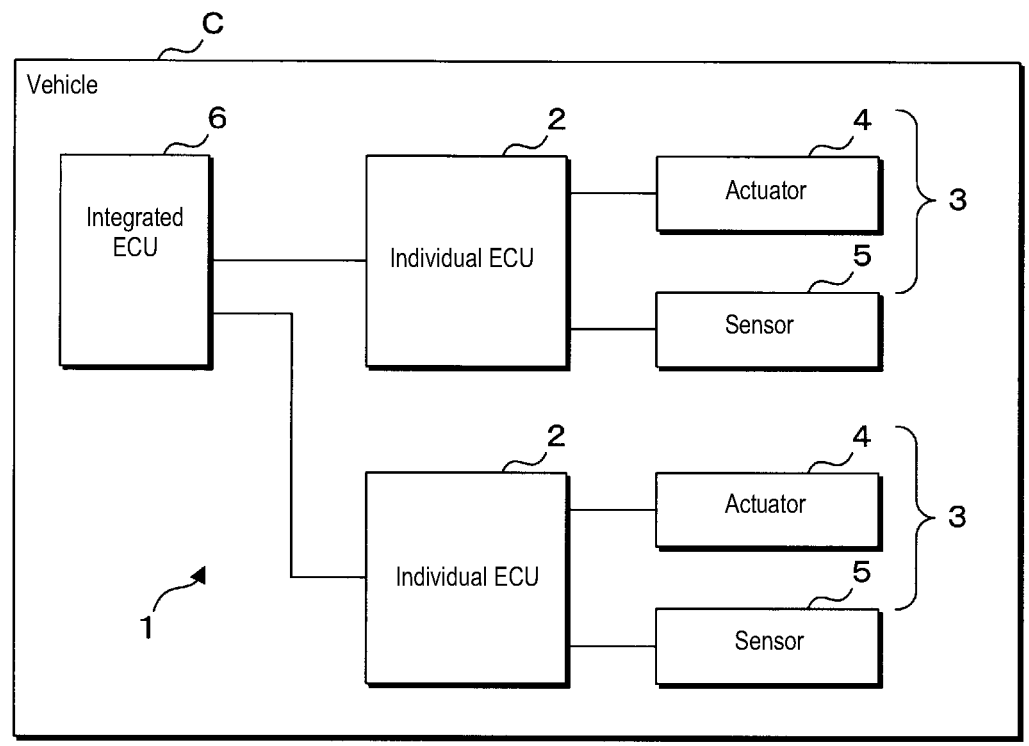
FIG. 1 is a schematic diagram depicting the configuration of a vehicle-mounted system according to a first embodiment.

Embodiments of the present disclosure will first be listed and described in outline. At least some parts of the embodiments described below may be freely combined.

A vehicle-mounted apparatus according to one aspect of the present disclosure is a vehicle-mounted apparatus that is connected to a plurality of vehicle-mounted ECUs, relays messages output by the plurality of vehicle-mounted ECUs, and includes: a first processing unit for performing relay processing on the messages, the first processing unit being connected to each of the plurality of vehicle-mounted ECUs; a second processing unit for performing relay processing on the messages, the second processing unit being connected to each of the plurality of vehicle-mounted ECUs; a first routing table including a relay destination of each message to be processed at the first processing unit; and a second routing table including a relay destination of each message to be processed at the second processing unit, wherein each of the first processing unit and the second processing unit includes a connection unit to which wiring connected to the plurality of vehicle-mounted ECUs is connected, the first processing unit performs the relay processing based on the first routing table, and the second processing unit performs the relay processing based on the second routing table.

In this aspect, the vehicle-mounted apparatus relays messages output by a plurality of vehicle-mounted ECUs using the first routing table and the second routing table. Since the first processing unit and the second processing unit are connected to each vehicle-mounted ECU in the plurality of vehicle-mounted ECUs, it is possible to receive messages output from each vehicle-mounted ECU. Out of the messages output from the vehicle-mounted ECUs, the first processing unit performs relay processing on messages to be relayed at the first processing unit based on the first routing table. Out of the messages output from the vehicle-mounted ECUs, the second processing unit performs relay processing on the messages to be relayed at the second processing unit based on the second routing table. Since the relay processing is distributed between the first processing unit and the second processing unit, the respective loads on the first processing unit and the second processing unit during the relay processing are small. The vehicle-mounted apparatus is therefore capable of performing the relay processing efficiently. The vehicle-mounted apparatus is capable of relaying communication by the vehicle-mounted ECUs even when the processing capabilities of the first processing unit and the second processing unit are low.

In a vehicle-mounted apparatus according to an aspect of the present disclosure, the first routing table includes the relay destination of each message to be processed at the second processing unit, and the first processing unit determines whether preparations for the relay processing have been completed at the second processing unit and performs, when the preparations for the relay processing have not been completed at the second processing unit, the relay processing on the messages to be processed at the first processing unit and the messages to be processed at the second processing unit based on the first routing table.

In this aspect, the first routing table includes relay destinations of messages to be processed at the first processing unit and relay destinations of messages to be processed at the second processing unit. The first processing unit and the second processing unit may complete the preparations for the relay processing at different timing. On completing the preparations for the relay processing, the first processing unit determines whether the preparations for the relay processing have been completed at the second processing unit. When the second processing unit has not completed the preparations for the relay processing, the first processing unit performs the relay processing for both the messages to be processed at the first processing unit and the messages to be processed at the second processing unit based on the first routing table. Accordingly, the vehicle-mounted apparatus is capable of relaying each message output from the connected vehicle-mounted ECUs even when the preparations for the relay processing have not been completed at the second processing unit.

In a vehicle-mounted apparatus according to an aspect of the present disclosure, the second processing unit outputs, after completion of the preparations for the relay processing, a completion signal indicating the completion of the preparations for the relay processing and starts the relay processing on the messages to be processed at the second processing unit based on the second routing table after the completion signal has been output, and the first processing unit starts, when the completion signal has been received, the relay processing on the messages to be processed at the first processing unit based on the first routing table.

In this aspect, when the preparations for the relay processing have been completed at the first processing unit and the preparations for the relay processing have not been completed at the second processing unit, as described earlier, the first processing unit performs the relay processing on the messages to be processed at the first processing unit and the messages to be processed at the second processing unit. After the second processing unit has completed the preparations for the relay processing, a completion signal is output to the first processing unit. After the completion signal has been output, the second processing unit starts relay processing on the messages to be processed at the second processing unit based on the second routing table. When the output completion signal has been received, the first processing unit starts relay processing on the messages to be processed at the first processing unit based on the first routing table. That is, the first processing unit and the second processing unit start relay processing on the messages to be relayed respectively by them. The vehicle-mounted apparatus is capable of distributing the relay processing and having the first processing unit and the second processing unit execute the relay processing even when the first processing unit and the second processing unit complete the preparations for the relay processing at different timing.

In a vehicle-mounted apparatus according to an aspect of the present disclosure, the first processing unit outputs, when a message is received in a state where the completion signal has been received, a save signal, which indicates a start of saving of the messages to be processed, to the second processing unit, outputs, after relaying the message received after the completion signal was received, a transmission signal, which indicates a start of transmission of the messages to be processed, to the second processing unit, and starts the relaying processing on the messages to be processed at the first processing unit after outputting the transmission signal, and the second processing unit starts saving the messages to be processed at the second processing unit when the save signal has been received and starts transmission of messages to be processed at the second processing unit to the relay destinations when the transmission signal has been received.

In this aspect, when the first processing unit has received the completion signal and then received a message, the first processing unit outputs a save signal to the second processing unit. The first processing unit then relays the received message. The first processing unit outputs a transmission signal to the second processing unit after relaying the message received after the completion signal was received and before receiving any new messages. After outputting the transmission signal, the first processing unit starts relay processing on the messages to be processed at the first processing unit. When the second processing unit has received the output save signal, the second processing unit starts saving the messages to be processed at the second processing unit. When the second processing unit has received the output transmission signal, the second processing unit starts transmitting the messages to be processed at the second processing unit to the relay destinations. Due to the first processing unit and the second processing unit performing the processing described above, the vehicle-mounted apparatus is capable of relaying messages without omission when switching from a state where the first processing unit out of the first processing unit and the second processing unit performs the relay processing to a state where the first processing unit and the second processing unit perform the relay processing. It is also possible to prevent the first processing unit and the second processing unit from relaying the same message.

In a vehicle-mounted apparatus according to an aspect of the present disclosure, the first processing unit confirms an operating state of the second processing unit, and performs, when the second processing unit is in a stopped state, the relay processing on the messages to be processed at the first processing unit and the messages to be processed at the second processing unit based on the first routing table.

In this aspect, the first processing unit confirms the operating state of the second processing unit. When the second processing unit is in a stopped state, that is, the second processing unit has "frozen", the first processing unit performs the relay processing for the messages to be processed at the first processing unit and the messages to be processed at the second processing unit. The vehicle-mounted apparatus is capable of relaying messages even when the second processing unit is in the stopped state.

In a vehicle-mounted apparatus according to an aspect of the present disclosure, one of the first processing unit and the second processing unit is equipped with a hardware gateway unit that relays some of the messages, and relays other messages out of the messages as software processing, and another of the first processing unit and the second processing unit relays remaining messages out of the messages as the software processing. As examples of the hardware gateway unit, it is possible to use a cellular interface, an Ethernet port interface, a universal serial bus interface, and a Controller Area Network automotive Ethernet interface. However, the hardware gateway unit is not limited to these examples, and may be hardware provided with a circuit for relaying messages output by vehicle-mounted ECUs based on predetermined rules. The hardware gateway unit (or "HAG unit") may be constructed for example by an ASIC (Application Specific Integrated Circuit), an FPGA (Field Programmable Gate Array), or a PLD (Programmable Logic Device).

In this aspect, the time required by relay processing when the hardware gateway unit is used to relay messages is shorter than the time required by relay processing when messages are relayed as software processing. When messages are to be relayed from vehicle-mounted ECUs that require high responsiveness, the vehicle-mounted apparatus can be made compatible with the vehicle-mounted ECUs that require high responsiveness by having one of the first processing unit and the second processing unit perform the relay processing using a hardware gateway. In addition, since the first processing unit and the second processing unit both relay messages as software processing, the vehicle-mounted apparatus can relay communication more efficiently.

A method for relaying according to an aspect of the present disclosure is a method where a vehicle-mounted apparatus, including a first processing unit and a second processing unit that are connected to each of a plurality of vehicle-mounted ECUs and perform relay processing on messages output by the plurality of vehicle-mounted ECUs, relays the messages and includes: the first processing unit performing the relay processing based on a first routing table including a relay destination of each message to be processed at the first processing unit; and the second processing unit performing the relay processing based on a second routing table including a relay destination of each message to be processed at the second processing unit.

In this aspect, in the same way as aspect (1), the relay processing is distributed to and performed by the first processing unit and the second processing unit, which means that the respective loads of the first processing unit and the second processing unit during the relay processing are small. The vehicle-mounted apparatus can therefore perform the relay processing efficiently.

In the method of relaying according to an aspect of the present disclosure, a hardware gateway unit provided in one of the first processing unit and the second processing unit relays some messages out of the messages, the one of the first processing unit and the second processing unit relays other messages out of the messages as software processing, and another of the first processing unit and the second processing unit relays remaining messages out of the messages as software processing.

In this aspect, in the same way as aspect (6), when messages are to be relayed from vehicle-mounted ECUs that require high responsiveness, the vehicle-mounted apparatus can be made compatible with the vehicle-mounted ECUs that require high responsiveness by having one of the first processing unit and the second processing unit perform the relay processing using a hardware gateway. In addition, since the first processing unit and the second processing unit both relay messages as software processing, the vehicle-mounted apparatus can relay communication more efficiently.

Specific embodiments of the present disclosure will now be described with reference to the attached drawings. A vehicle-mounted apparatus according to an embodiment of the present disclosure will now be described with reference to the drawings. Note that the present disclosure is not limited to the illustrated configurations and is instead indicated by the range of the patent claims and intended to include all changes within the meaning and scope of the patent claims and their equivalents.

First Embodiment

Embodiments of the present disclosure will now be described with reference to the drawings. FIG. 1 is a schematic diagram depicting the configuration of a vehicle-mounted system according to a first embodiment. This vehicle-mounted system includes an integrated ECU 6 mounted in a vehicle C, a plurality of individual ECUs 2, and vehicle-mounted devices 3 connected to the individual ECUs 2. Although two individual ECUs 2 are provided in the vehicle C in FIG. 1, the number of individual ECUs 2 is not limited to two. The integrated ECU 6 and the respective individual ECUs 2 are connected.

The individual ECUs 2 are disposed in various areas of the vehicle C. Each individual ECU 2 functions as a relaying apparatus, such as a gateway or an Ethernet switch, that relays communication between the plurality of vehicle-mounted devices 3, which are connected via a vehicle-mounted network 1 to that individual ECU 2, or communication between the vehicle-mounted devices 3 and the integrated ECU 6. Note that in addition to relaying communication, each individual ECUs 2 may also function as a power distributing apparatus that distributes and relays power output from a power storage apparatus (not depicted) to supply power to the vehicle-mounted devices 3 connected to that ECU.

Each vehicle-mounted device 3 includes various sensors 5, such as a LiDAR (Light Detection and Ranging), a light sensor, a CMOS camera, and an infrared sensor, and an actuator 4, such as a door opening/closing apparatus or a motor apparatus. The vehicle-mounted devices 3 are not limited to the above examples and may be switches, such as door switches or lamp switches, or may be lamps.

Each individual ECU 2 performs driving control over the connected actuator 4. The individual ECU 2 acquires an output signal output from the sensor 5 and transmits a request signal, which has been generated based on the acquired output signal, to the integrated ECU 6. This request signal includes a detection value of the sensor 5, for example. The integrated ECU 6 acquires the request signals transmitted from the individual ECUs 2 and transmits control signals generated based on the detection values of the sensors 5 to the individual ECUs 2. Each individual ECU 2 performs driving control of the actuator 4 based on a control signal transmitted from the integrated ECU 6.

Figure 2:
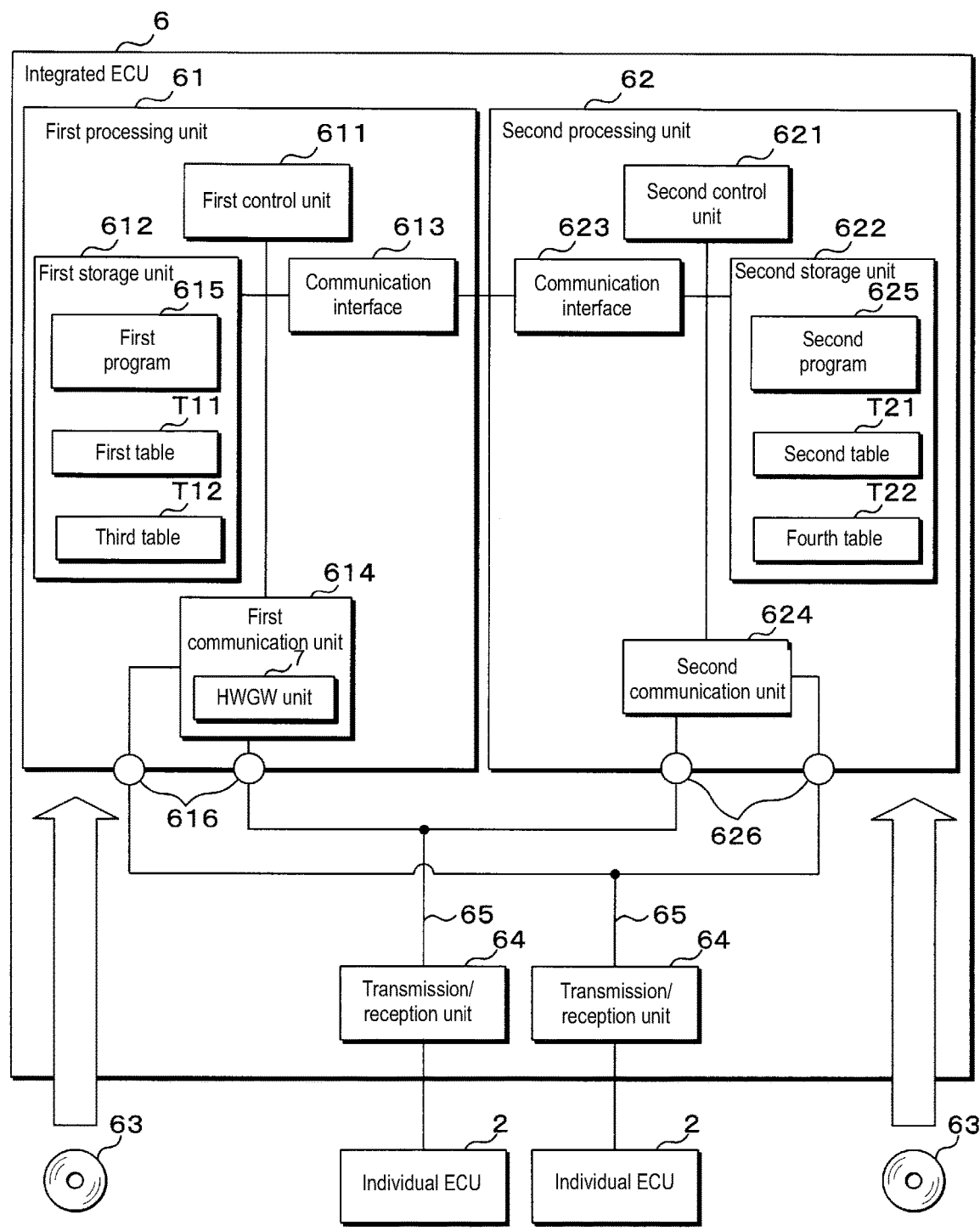
FIG. 2 is a block diagram depicting the configuration of an integrated ECU.

FIG. 2 is a block diagram depicting the configuration of the integrated ECU 6. The integrated ECU 6 functions as a relay apparatus, such as a gateway or an Ethernet switch, which relays communication between the plurality of individual ECUs 2. This relaying of communication between the individual ECUs 2 is relaying of messages transmitted and received by the individual ECUs 2. Although CAN (Controller Area Network) communication protocol is used for the communication in this example, the communication protocol used for communication is not limited to CAN. As examples, the communication protocol may be CAN-FD (Controller Area Network with Flexible Data rate), Ethernet (registered trademark) or FlexRay (registered trademark). The integrated ECU 6 may convert between protocols and relay communication of different communication protocols.

The messages output from an individual ECU 2 include control messages for controlling the vehicle C and diagnostic messages for diagnosing abnormalities at the vehicle-mounted devices 3. The diagnostic messages are so-called dialog messages. The control messages include high-priority control messages to be processed with high priority and low-priority control messages to be processed with lower priority than the high-priority control messages. Accordingly, the types of messages output from the individual ECUs 2 are classified into three types: high-priority control messages, low-priority control messages, and diagnostic messages. Note that the priority of processing for diagnostic messages is lower than the priority of processing for high-priority control messages.

As one example, high-priority control messages are messages relating to the running of the vehicle, and include a message for controlling a vehicle-mounted device 3 that requires high responsiveness, such as the engine or the brakes. The high-priority control messages include messages relating to autonomous driving. Low-priority control messages include messages relating to body control, such as messages that control turning on and off of the front room lamps, and entertainment system messages for controlling a sat-nav system, audio system, or the like mounted in the vehicle.

As depicted in FIG. 2, the integrated ECU 6 includes a first processing unit 61 and a second processing unit 62 that perform relay processing, and transmission/reception units 64 for transmitting and receiving messages to and from the individual ECUs. In addition, the integrated ECU 6 includes wiring 65 that connects the first processing unit 61 and the second processing unit 62 to the transmission/reception units 64. Each transmission/reception unit 64 is a physical layer interface decided according to the communication protocol. As one example, if the communication protocol is Ethernet, the transmission/reception units 64 are Ethernet PHY units that supports packets such as TCP/IP or UDP/IP. Each transmission/reception unit 64 is connected to an individual ECU 2. As one example, the integrated ECU 6 is equipped with a number of transmission/reception units 64 that corresponds to the number of the individual ECUs 2. In the present embodiment, the integrated ECU 6 is provided with two transmission/reception units 64 and two sets of the wiring 65. One transmission/reception unit 64 is connected to one individual ECU 2. This transmission/reception unit 64 is also connected by one set of the wiring 65 to the first processing unit 61 and the second processing unit 62. The other transmission/reception unit 64 is connected to the other individual ECU 2. This other transmission/reception unit 64 is connected by the other set of wiring 65 to the first processing unit 61 and the second processing unit 62. The sets of wiring 65 are connected via the transmission/reception units 64 to the individual ECUs 2. Note that the number of transmission/reception units 64 and sets of wiring 65 are not limited to two.

The first processing unit 61 and the second processing unit 62 are individual processors. In the present embodiment, an example where the first processing unit 61 and the second processing unit 62 are separate microcontrollers will be described. Note that the first processing unit 61 and the second processing unit 62 are not limited to microcontrollers. As described above, the first processing unit 61 and the second processing unit 62 are connected to the respective transmission/reception units 64 by the wiring 65. Accordingly, the first processing unit 61 and the second processing unit 62 are connected to one individual ECU 2 via one transmission/reception unit 64 and one set of wiring 65. The first processing unit 61 and the second processing unit 62 are also connected to the other individual ECU 2 via the other transmission/reception unit 64 and the other set of wiring 65. In other words, each of the individual ECUs 2 is connected to both the first processing unit 61 and the second processing unit 62 via one of the transmission/reception units 64 and the wiring 65. Both the first processing unit 61 and the second processing unit 62 are capable of transmitting and receiving messages to and from each individual ECU 2. Note that the integrated ECU 6 may be provided with three or more processing units composed of individual processors. As one example, the integrated ECU 6 may include the first processing unit 61, the second processing unit 62, and a third processing unit, which are separate processors.

The first processing unit 61 is equipped with connection units 616 connected to the wiring 65. The first processing unit 61 is additionally equipped with a first control unit 611, a first storage unit 612, a communication interface 613 and a first communication unit 614. The first control unit 611, the first storage unit 612, the communication interface 613, and the first communication unit 614 are connected. The connection units 616 and the first communication unit 614 are connected. The first control unit 611 is a computational processing apparatus, such as a CPU (Central Processing Unit) or an MPU (Micro Processing Unit). The first control unit 611 reads out a first program 615 and data stored in advance in the first storage unit 612 and executes the first program 615 to perform various control processing, computational processing, and the like. As one example, the first control unit 611 performs security-related processing, such as encryption and decryption of messages and confirmation of message IDs.

The first storage unit 612 is composed of a volatile memory element, such as RAM (Random Access Memory) or a non-volatile memory element, such as ROM (Read Only Memory), EEPROM (Electrically Erasable Programmable ROM), or flash memory. The first storage unit 612 stores in advance the first program 615 to be executed by the first control unit 611 and the data referred to by the first control unit 611 during processing. The first program 615 stored in the first storage unit 612 may be a first program 615 that has been read out from a recording medium 63 that is readable by the integrated ECU 6. Alternatively, the first program 615 may be a first program 615 that has been downloaded from an external computer (not illustrated) connected to a communication network (not illustrated) and stored in the first storage unit 612. The first storage unit 612 additionally stores a first table T11 and a third table T12, which will be described later.

The communication interface 613 is a communication interface for communication with the second processing unit 62. The communication interface 613 is connected to a communication interface 623, which is provided in the second processing unit 62 and will be described later.

The first communication unit 614 is an input/output interface that uses a predetermined communication protocol. The first control unit 611 performs two-way communication with each individual ECU 2 via the first communication unit 614. As one example, the predetermined communication protocol is CAN communication protocol. In this case, the first communication unit 614 is a CAN controller and a CAN receiver, for example. Note that the predetermined communication protocol is not limited to CAN communication protocol, and as another example may be Ethernet communication protocol. In the present embodiment, the first communication unit 614 includes a hardware gateway (HWGW) unit 7, which will be described later. The first control unit 611 performs two-way communication with each individual ECU 2 via the first communication unit 614.

Figure 3:
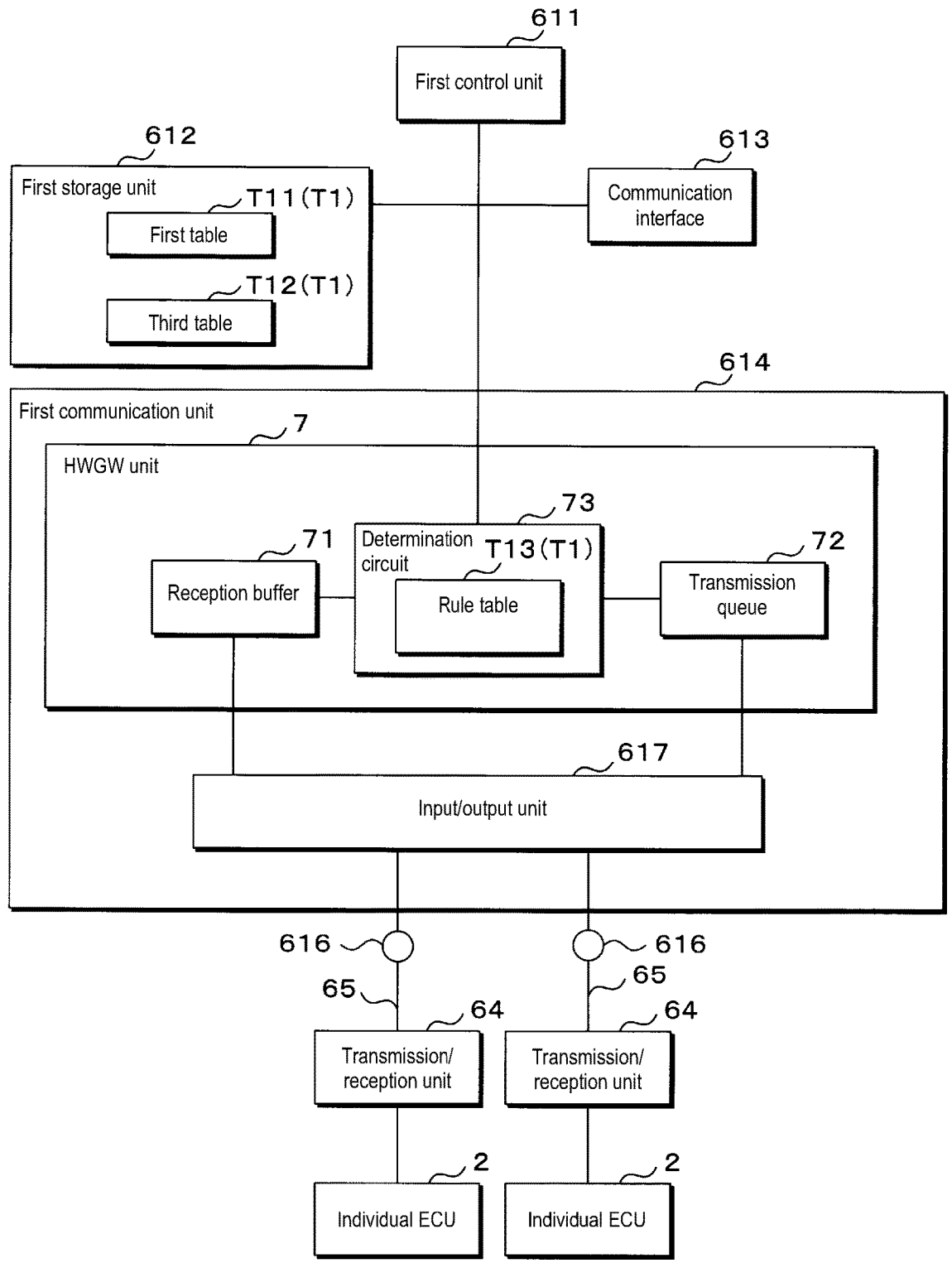
FIG. 3 is a block diagram depicting the configuration of a first communication unit.

FIG. 3 is a block diagram depicting the configuration of the first communication unit 614. In FIG. 3, part of the wiring 65 connecting the transmission/reception units 64 and the second processing unit 62 has been omitted from the drawing. The first communication unit 614 includes an input/output unit 617 in addition to the HWGW unit 7. As one example, the input/output unit 617 is the pins of a microcontroller. The input/output unit 617 is connected to the connection units 616. The input/output unit 617 is connected to the individual ECUs 2 via connection units 616, the wiring 65, and the transmission/reception units 64, and outputs messages to the individual ECUs 2. Messages output from the individual ECUs 2 are also input into the input/output unit 617.

The HWGW unit 7 includes a reception buffer 71, a transmission queue 72, and a determination circuit 73. The reception buffer 71 is connected to the input/output unit 617 and the determination circuit 73. Messages input into the input/output unit 617 are stored in the reception buffer 71.

The transmission queue 72 is connected to the input/output unit 617 and the determination circuit 73. The transmission queue 72 is a memory (or "queue") that temporarily stores messages to be relayed. In the present embodiment, the transmission queue 72 has a plurality of queues corresponding to the relay destinations. In more detail, the transmission queue 72 includes a queue for relaying messages to one individual ECU 2 and a queue for relaying messages to the other individual ECU 2.

The determination circuit 73 is connected to the first control unit 611. The determination circuit 73 includes a rule table T13 in which relay destinations of high-priority control messages are stored. FIG. 4 is a conceptual diagram depicting an example content of the rule table T13. The rule table T13 in FIG. 4 includes a message column, a relay destination column, and a message type column. In the rule table T13, out of the messages output from the individual ECUs 2, messages whose message type is high-priority control message and information on the relay destination of each message are stored in association with each other. In more detail, messages whose message type is high priority control message are stored in the message column of the rule table T13. Information on the relay destination of each message, for example, the address of the individual ECU 2 that is the relay destination, is stored in the relay destination column. As a message whose message type is high-priority control message, a message identifier may be stored in the rule table T13. As one example, this message identifier is a message ID. Note that the message types are indicated in FIG. 4 for explanatory purposes, and therefore the rule table T13 may omit the message type column.

Out of the messages to be stored in the reception buffer 71, the determination circuit 73 stores messages stored in the rule table T13 into the transmission queue 72 based on the rule table T13. In more detail, the determination circuit 73 stores each high-priority control message in the queue that corresponds to the relay destination. The messages stored in the transmission queue 72 are output (relayed) via the input/output unit 617 to the individual ECU 2 that is the relay destination. Accordingly, high priority control messages are relayed based on the rule table T13.

Out of the messages stored in the reception buffer 71, the determination circuit 73 outputs messages that are not stored in the rule table T13 to the first control unit 611. That is, the determination circuit 73 outputs messages of types aside from high-priority control message to the first control unit 611. Although described in detail later, the determination circuit 73 specifies the relay destination of these messages output from the determination circuit 73 based on the first table T11 or the third table T12. The first control unit 611 outputs a message whose relay destination has been specified via the determination circuit 73 to the transmission queue 72 and has the message stored in the queue corresponding to the relay destination. Each message stored in the transmission queue 72 is output (relayed) via the input/output unit 617 to the individual ECU 2 that is the relay destination.

By executing the first program 615, the first control unit 611 relays messages as software processing. This relaying of messages as software processing performed by the first control unit 611 is performed based on the first table T11 or the third table T12.

FIG. 5 is a conceptual diagram depicting an example content of the first table T11. The first table T11 includes a message column, a relay destination column, a message type column, and a priority column. In the first table T11, a message, information on a relay destination of the message, the type of the message, and the priority of the message are stored in association with each other. In the example in FIG. 5, out of the messages output from the individual ECUs 2, messages whose message type is low-priority control message are stored in the message column of the first table T11. Information on the relay destination of each message, as one example the address of the individual ECU 2 that is the relay destination, is stored in the relay destination column. The type of each message is stored in the message type column. The priority of each message is stored in the priority column. Since the message type of messages in the first table T11 of FIG. 5 is "low-priority control message", the priority of each message is "low". A message identifier may be stored in the first table T11 as a message whose message type is low-priority control message. Note that the message types and priorities are indicated in FIG. 5 for explanatory purposes, and therefore the first table T11 may omit the message type column and the priority column.

FIG. 6 is a conceptual diagram depicting an example content of the third table T12. In the same way as the first table T11, the third table T12 includes a message column, a relay destination column, a message type column, and a priority column. In the third table T12, messages, information on the relay destination of each message, the type of each message, and the priority of each message are stored in association with each other. In more detail, messages of a type aside from the high-priority control message that have been output from an individual ECU 2 are stored in the message column of the third table T12. That is, the message column of the third table T12 stores messages that have been output from an individual ECU 2 and whose type is low-priority control message or diagnostic message. Information on the relay destination of each message is stored in the relay destination column. The type of each message is stored in the message type column. The priority of each message is stored in the priority column. Since the type of each message in the third table T12 in FIG. 6 is low-priority control message or diagnostic message, the priority of each message is "low". A message identifier may be stored in the third table T12 as a message whose type is low-priority control message or diagnostic message. Note that the message types and priorities are indicated in FIG. 6 for explanatory purposes, and therefore the third table T12 may omit the message type column and the priority column.

The first control unit 611 refers to the first table T11 or the third table T12 to specify the relay destination of a message to be output from the determination circuit 73. As described earlier, the first control unit 611 outputs a message whose relay destination has been specified to the transmission queue 72. The output message is transmitted to the individual ECU 2 that is the relay destination. To do so, the first control unit 611 determines which of the first table T11 and the third table T12 is to be referred to as described later. In the following description, the rule table T13, the first table T11, and the third table T12 are collectively referred to as the "first routing table T1".

As depicted in FIG. 2, the second processing unit 62 is equipped with connection units 626 connected to the wiring 65. The second processing unit 62 is additionally equipped with a second control unit 621, a second storage unit 622, the communication interface 623, and a second communication unit 624. The second control unit 621, the second storage unit 622, the communication interface 623, and the second communication unit 624 are connected. The connection units 626 and the second communication unit 624 are connected. The second control unit 621 is composed of a computational processing apparatus, such as a CPU or MPU, and reads out a second program 625 and data stored in advance in the second storage unit 622 and executes the second program 625 to perform various control processing, computational processing, and the like. As one example, the second control unit 621 performs security-related processing.

The second storage unit 622 is composed of a volatile memory element, such as RAM, or a non-volatile memory element, such as ROM, EEPROM, or flash memory. The second storage unit 622 stores in advance the second program 625 to be executed by the second control unit 621 and data referred to by the second control unit 621 during processing. The second program 625 stored in the second storage unit 622 may be a second program 625 that has been read out from the recording medium 63 that is readable by the integrated ECU 6. Alternatively, the second program 625 may be a second program 625 that has been downloaded from an external computer (not illustrated) connected to a communication network (not illustrated) and stored in the second storage unit 622. The second storage unit 622 additionally stores a second table T21 and a fourth table T22, which will be described later.

A communication interface 623 is a communication interface for communicating with the first processing unit 61 and is connected to the communication interface 613. The first control unit 611 and the second control unit 621 communicate via the communication interface 613 and the communication interface 623. That is, the first processing unit 61 and the second processing unit 62 communicate via the communication interface 613 and the communication interface 623. Although the first processing unit 61 and the second processing unit 62 perform serial communication here as one example, the communication between the first processing unit 61 and the second processing unit 62 is not limited to serial communication.

The second communication unit 624 is an input/output interface that uses a predetermined communication protocol. When the predetermined communication protocol is CAN, the second communication unit 624 is a CAN controller and a CAN receiver, for example. Unlike the first communication unit 614, the second communication unit 624 in the present embodiment does not include the HWGW unit 7. The second control unit 621 performs two-way communication with each individual ECU 2 via the second communication unit 624.

Figure 7:
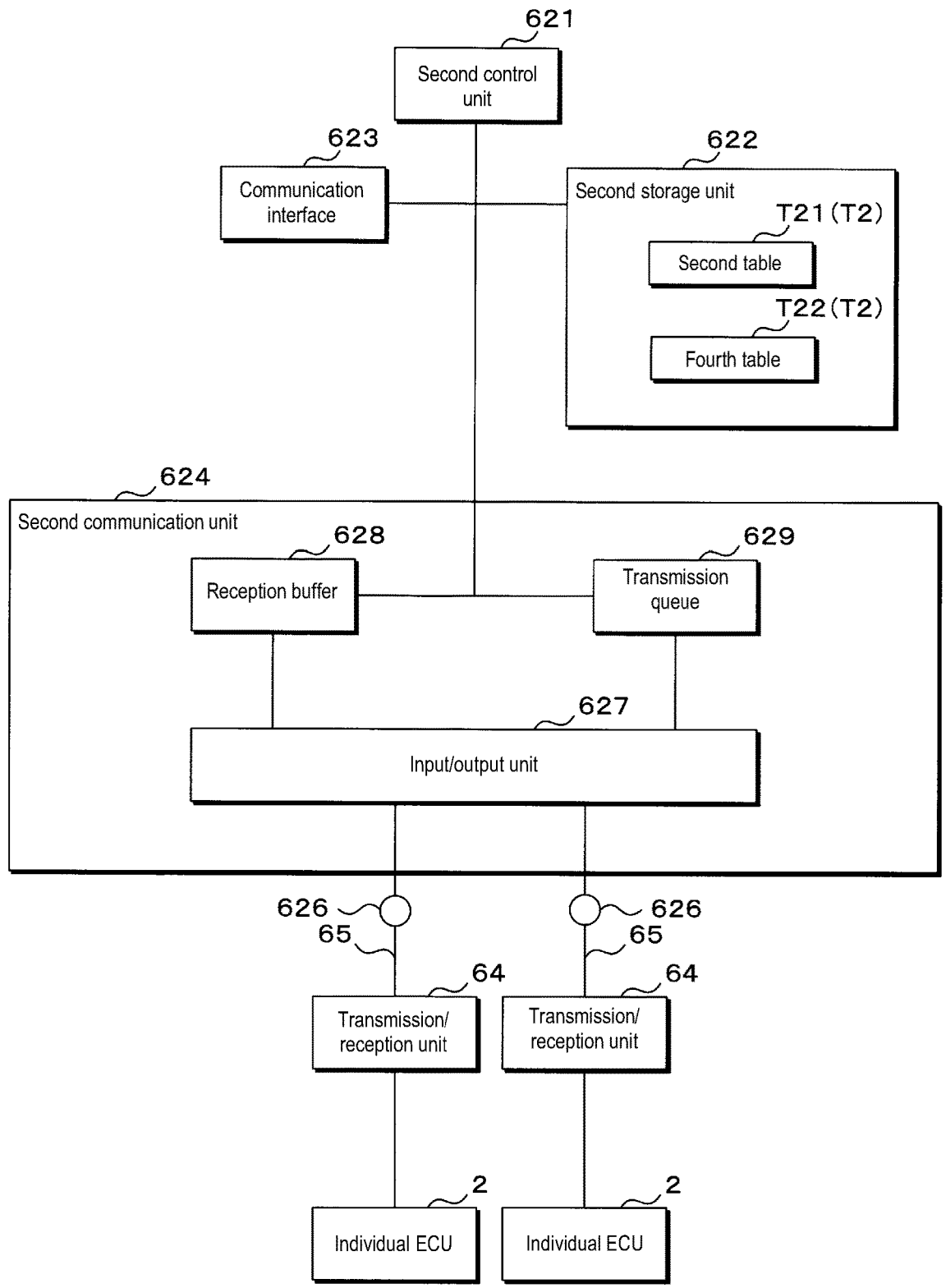
FIG. 7 is a block diagram depicting the configuration of a second communication unit.

FIG. 7 is a block diagram depicting the configuration of the second communication unit 624. In FIG. 7, part of the wiring 65 connecting the transmission/reception units 64 and the first processing unit 61 has been omitted from the drawing. The second communication unit 624 is equipped with an input/output unit 627, a reception buffer 628, and a transmission queue 629. The input/output unit 627, the reception buffer 628, and the transmission queue 629 are connected. As one example, the input/output unit 627 is the pins of a microcontroller. The input/output unit 627 is connected to the connection units 626. The input/output unit 627 is connected to the individual ECUs 2 via the connection units 626, the wiring 65, and the transmission/reception units 64, and outputs messages to the individual ECUs 2. Messages output from the individual ECUs 2 are also input into the input/output unit 627.

The reception buffer 628 and the transmission queue 629 are connected to the second control unit 621. The reception buffer 628 stores the messages input into the input/output unit 627. The transmission queue 629 is a queue that temporarily stores messages to be relayed. In the same way as the transmission queue 72, the transmission queue 629 has a plurality of queues in keeping with the relay destinations.

Although described in detail later, the second control unit 621 specifies the relay destination of each message stored in the reception buffer 628 based on the second table T21 or the fourth table T22. The second control unit 621 outputs each message whose relay destination has been specified to the transmission queue 629 and stores the message in the queue corresponding to the relay destination. Each message stored in the transmission queue 629 is output (relayed) to the individual ECU 2 that is the relay destination via the input/output unit 627.

The second control unit 621 relays messages as software processing by executing the second program 625. Relaying of messages as software processing performed by the second control unit 621 is performed based on the second table T21 or the fourth table T22.

FIG. 8 is a conceptual diagram depicting an example content of the second table T21. The second table T21 includes a message column, a relay destination column, a message type column, and a priority column. In the second table T21, messages, information on the relay destination of each message, the type of each message, and the priority of each message are stored in association with each other. In more detail, out of the messages output from an individual ECU 2, messages whose message type is diagnostic message are stored in the message column of the second table T21. Information on the relay destination of each message is stored in the relay destination column. The type of each message is stored in the message type column. The priority of each message is stored in the priority column. Since the type of each message in the second table T21 in FIG. 8 is diagnostic message, the priority of each message is "low". A message identifier may be stored in the second table T21 as a message whose type is diagnostic message. Note that the message types and priorities are indicated in FIG. 8 for explanatory purposes, and therefore the second table T21 may omit the message type column and the priority column.

FIG. 9 is a conceptual diagram depicting an example content of the fourth table T22. The fourth table T22 includes a message column, a relay destination column, a message type column, and a priority column. In the fourth table T22, messages, information on a relay destination of each message, the type of each message, and the priority of each message are stored in association with each other. In more detail, every message output from the individual ECUs 2 is stored in the message column of the fourth table T22. That is, messages that have been output from the individual ECUs 2 and whose message types are high-priority control message, low-priority control message, or diagnostic message are stored in the message column of the fourth table T22. Information on the relay destination of each message is stored in the relay destination column. The message type of each message is stored in the message type column. The priority of each message is stored in the priority column. In the example in FIG. 9, the priority associated with the high priority control messages is "high". The priority associated with low priority control messages and diagnostic messages is "low". Message identifiers may be stored in the fourth table T22 as messages whose type is high-priority control message, low-priority control message, or diagnostic message. Note that the message types and priorities are indicated in FIG. 9 for explanatory purposes, and therefore the fourth table T22 may omit the message type column and the priority column.

The second control unit 621 refers to the second table T21 or the fourth table T22 to specify the relay destination of each message stored in the reception buffer 628. As described earlier, the second control unit 621 outputs each message whose relay destination has been specified to the transmission queue 629. Each output message is transmitted to the individual ECU 2 that is the relay destination. The second control unit 621 determines which of the second table T21 and the fourth table T22 is to be referred to as described later. In the following description, the second table T21 and the fourth table T22 are also collectively referred to as the "second routing table T2".

The determination of which of the first table T11 and the third table T12 is to be referred to by the first control unit 611 in the relay processing will now be described. The first control unit 611 determines whether the second processing unit 62 has completed its preparations for relay processing, and refers to either the first table T11 or the third table T12 in keeping with the determination result. Note that in the present embodiment, when the first processing unit 61 is activated, preparations for the relay processing commence at the first processing unit. In the same way as the first processing unit, when the second processing unit is activated, preparations for the relay processing commence at the second processing unit.

As one example, when determining whether the preparations for the relay processing have been completed at the second processing unit 62, the first control unit 611 attempts to establish communication between the first processing unit 61 and the second processing unit 62. Note that communication between the first processing unit 61 and the second processing unit 62 is communication by the communication interface 613 and the communication interface 623. When communication between the first processing unit 61 and the second processing unit 62 has been established, the first control unit 611 determines that preparations for relay processing at the second processing unit 62 have been completed.

When the preparations for the relay processing have been completed at the second processing unit 62, the first control unit 611 refers to the first table T11 to specify the relay destination of each message to be output from the determination circuit 73. In this case, although the relay destinations of messages stored in the first table T11 are specified, relay destinations are not specified for messages not stored in the first table T11. As described earlier, the first control unit 611 outputs messages whose relay destinations have been specified to the transmission queue 72. Each output message is transmitted to the individual ECU 2 that is the relay destination. Accordingly, when the preparations for relay processing have been completed at the second processing unit 62, the first processing unit 61 performs relay processing on the messages stored in the rule table T13 and the messages stored in the first table T11. For the examples of the rule table T13 and the first table T11 described above, when the preparations for the relay processing have been completed at the second processing unit 62, the first processing unit 61 performs the relay processing for high priority control messages and the low priority control messages.

Hereinafter, messages to be relayed by relay processing based on the rule table T13 or the first table T11 are also referred to as "messages to be processed at the first processing unit 61". Although the messages to be processed at the first processing unit 61 in the present embodiment are high-priority control messages and low-priority control messages, the messages to be processed at the first processing unit 61 are not limited to the above example. In other words, the messages stored in the rule table T13 are not limited to high priority control messages. The messages stored in the first table T11 are not limited to low priority control messages.

When communication has not been established between the first processing unit 61 and the second processing unit 62, the first control unit 611 determines that the preparations for relay processing have not been completed at the second processing unit 62. When the second processing unit 62 has not completed the relay processing, the first control unit 611 refers to the third table T12 to specify the relay destinations of messages. As described earlier, the first control unit 611 outputs messages whose relay destinations have been specified to the transmission queue 72. Each output message is transmitted to the individual ECU 2 that is the relay destination. Accordingly, when preparations for the relay processing have not been completed at the second processing unit 62, the first processing unit 61 performs the relay processing for every message output from the individual ECUs 2 connected to the integrated ECU 6. Even when the preparations for the relay processing have not been completed at the second processing unit 62, the integrated ECU 6 will still be capable of relaying every message output from the connected individual ECUs 2 through relaying by the HWGW unit 7 and relaying as software processing performed by the first control unit 611.

The determination of which of the second table T21 and the third table T12 is to be referred to by the second control unit 621 in the relay processing will now be described. The second control unit 621 determines whether the preparations for the relay processing have been completed at the first processing unit 61, and refers to either the second table T21 or the fourth table T22 in keeping with the determination result. As one example, the second control unit 621 attempts to establish communication between the first processing unit 61 and the second processing unit 62. When communication between the first processing unit 61 and the second processing unit 62 has been established, the second control unit 621 determines that preparations for the relay processing have been completed at the first processing unit 61.

When the preparations for the relay processing have been completed at the first processing unit 61, the second control unit 621 refers to the second table T21 to specify the relay destination of each message stored in the reception buffer 628 of the second communication unit 624. In this case, although the relay destinations of messages stored in the second table T21 are specified, relay destinations are not specified for messages not stored in the second table T21. As described earlier, the second control unit 621 outputs messages whose relay destinations have been specified to the transmission queue 629. Each output message is transmitted to the individual ECU 2 that is the relay destination. Accordingly, when the preparations for the relay processing have been completed at the first processing unit 61, the second processing unit 62 performs relay processing on the messages stored in the second table T21. For the example of the second table T21 described above, when the preparations for the relay processing have been completed at the first processing unit 61, the second processing unit 62 performs the relay processing on the diagnostic messages.

Hereinafter, messages to be relayed by relay processing based on the second table T21 are also referred to as "messages to be processed at the second processing unit 62". Although the messages to be processed at the second processing unit 62 are diagnostic messages in the present embodiment, the messages to be processed at the second processing unit 62 are not limited to diagnostic messages. In other words, the messages stored in the second table T21 are not limited to diagnostic messages.

When preparations for the relay processing have been completed at both the first processing unit 61 and the second processing unit 62, the second processing unit 62 performs the relay processing on the diagnostic messages. In this case, the first processing unit 61 relays the high priority control messages and the low priority control messages as described earlier. The integrated ECU 6 has relay processing performed on messages output from the connected individual ECUs 2 by distributing the relay processing between the first processing unit 61 and the second processing unit 62.

When communication between the first processing unit 61 and the second processing unit 62 has not been established, the second control unit 621 determines that preparations for the relay processing have not been completed at the first processing unit 61. When preparations for the relay processing have not been completed at the first processing unit 61, the second control unit 621 refers to the fourth table T22 to specify the relay destination of each message. As described earlier, the second control unit 621 outputs each message whose relay destination has been specified to the transmission queue 629. Each output message is transmitted to the individual ECU 2 that is the relay destination. In this case, high priority control messages are relayed by the second control unit 621 as software processing. Accordingly, when preparations for the relay processing have not been completed at the first processing unit 61, the second processing unit 62 performs relay processing for every message output from the individual ECUs 2 connected to the integrated ECU 6.

Even when the preparations for the relay processing have not been completed at the first processing unit 61, the integrated ECU 6 will still be capable of relaying every message output from the connected individual ECUs 2 by performing relay processing based on the fourth table T22.

When the first processing unit 61 and the second processing unit 62 perform relay processing, the first control unit 611 confirms the operating state of the second processing unit 62. The operating states of the second processing unit 62 include a normal state where the second processing unit 62 can perform processing and a stopped state where the second processing unit 62 cannot perform processing. The stopped state is when the second processing unit 62 has "frozen". As one example, the first control unit 611 periodically communicates with the second control unit 621, and determines that the operation state of the second processing unit 62 is in the stopped state when communication is not possible. When the second processing unit 62 is in the stopped state, the first control unit 611 performs the relay processing based on the third table T12. That is, the first control unit 611 switches from referring to the first table T11 to referring to the third table T12.

When the first processing unit 61 and the second processing unit 62 perform relay processing, the second control unit 621 confirms the operating state of the first processing unit 61. As one example, the second control unit 621 periodically communicates with the first control unit 611 and determines that the operation state of the first processing unit 61 is the stopped state when communication is not possible. When the first processing unit 61 is in the stopped state, the second control unit 621 performs the relay processing based on the fourth table T22. That is, the second control unit 621 switches from referring to the second table T21 to referring to the fourth table T22.

By executing the first program 615 stored in the first storage unit 612, the first control unit 611 outputs a completion signal, which indicates completion of the relay processing, to the second processing unit 62 after preparations for the relay processing have been completed. By executing the second program 625 stored in the second storage unit 622, the second control unit 621 outputs a completion signal to the first processing unit 61 after the preparations for the relay processing have been completed.

By executing the first program 615 stored in the first storage unit 612, the first control unit 611 outputs a save signal indicating the start of saving of messages to be processed. In more detail, when the first control unit 611 has received a completion signal from the second processing unit 62 and then a message is received, the first control unit 611 outputs a save signal, which indicates the start of saving of messages to be processed at the second processing unit 62, to the second processing unit 62. By executing the first program 615 stored in the first storage unit 612, the first control unit 611 outputs a transmission signal indicating the start of transmission of the messages to be processed. In more detail, the first control unit 611 relays any messages already received after receiving the completion signal from the second processing unit 62 and outputs a transmission signal, which indicates the start of transmission of messages to be processed at the second processing unit 62, to the second processing unit 62 before any new messages are received.

The second control unit 621 outputs a save signal by executing the second program 625 stored in the second storage unit 622. In more detail, when the second control unit 621 has received a completion signal from the first processing unit 61 and then a message is received, the second control unit 621 outputs a save signal, which indicates the start of saving of messages to be processed at the first processing unit 61, to the first processing unit 61. By executing the second program 625 stored in the second storage unit 622, the second control unit 621 outputs a transmission signal. In more detail, the second control unit 621 relays any messages already received after the completion signal was received from the first processing unit 61, and outputs a transmission signal, which indicates the start of transmission of messages to be processed at the first processing unit 61, to the first processing unit 61 before any new messages are received.

Figure 10:
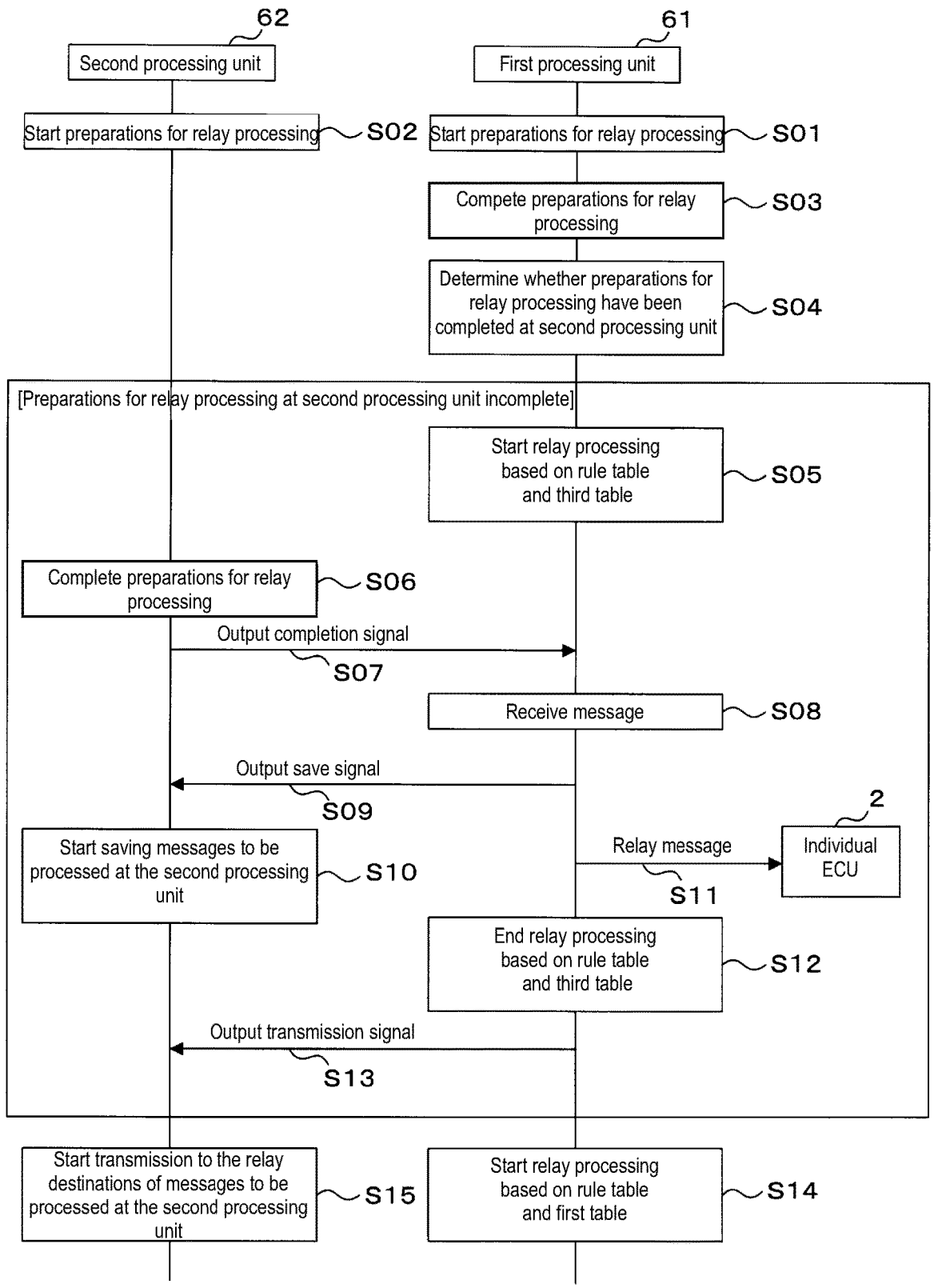
FIG. 10 is a sequence diagram depicting one example of relaying of messages by the integrated ECU.

FIG. 10 is a sequence diagram depicting one example of relaying of messages by the integrated ECU 6. The processing by which the integrated ECU 6 relays messages output from the individual ECUs 2 will now be described using a sequence diagram in FIG. 10 including the first processing unit 61 and the second processing unit 62. FIG. 10 depicts an example where the preparations for relay processing at the first processing unit 61 are completed earlier than the preparations for the relay processing at the second processing unit 62. In the following description, "step" is abbreviated to "S".

As one example, when an ignition switch (not illustrated) provided in the vehicle C is turned from OFF to ON, the first processing unit 61 is activated and starts the preparations for the relay processing (S01). In the same way as the first processing unit 61, the second processing unit 62 is activated when the ignition switch is turned from off to on and starts the preparations for the relay processing (S02). In the example in FIG. 10, the first processing unit 61 completes the preparations for the relay processing earlier than the second processing unit 62 (S03).

The first processing unit 61 determines whether the preparations for the relay processing have been completed at the second processing unit 62 (S04). As one example, the first processing unit 61 attempts to establish communication between the first processing unit 61 and the second processing unit 62. At this point, since the preparations for the relay processing have not been completed at the second processing unit 62, communication is not established between the first processing unit 61 and the second processing unit 62. Since communication between the first processing unit 61 and the second processing unit 62 has not been established, the first processing unit 61 determines that the preparations for the relay processing have not been completed at the second processing unit 62.

The first processing unit 61 starts the relay processing based on the rule table T13 and the third table T12 for every message output from the individual ECUs 2 connected to the integrated ECU 6 (S05). In more detail, the first processing unit 61 receives messages from the individual ECUs 2. Out of the received messages, each high-priority control message is relayed to the individual ECU 2 that is the relay destination based on the rule table T13 as described earlier. Each low-priority control message or diagnostic message is relayed to the individual ECU 2 that is the relay destination based on the third table T12 as described earlier. As one example, the first processing unit 61 repeats the relay processing based on the rule table T13 and the third table T12.

The second processing unit 62 completes the preparations for the relay processing at the second processing unit 62 (S06), and determines whether the preparations for the relay processing have been completed at the first processing unit 61. As one example, the second processing unit 62 attempts to establish communication with the first processing unit 61. Since communication is established between the first processing unit 61 and the second processing unit 62, the second processing unit 62 determines that the preparations for the relay processing have been completed at the first processing unit 61. The second processing unit 62 outputs a completion signal to the first processing unit 61 (S07), to notify the first processing unit 61 that the preparations for the relay processing have been completed at the second processing unit 62. Note that since the order in which the preparations for the relay processing at the first processing unit 61 and the second processing unit 62 are completed will depend on the respective configurations of the first processing unit 61 and the second processing unit 62, and the programs respectively referred to by the first processing unit 61 and the second processing unit 62, it is possible to specify the order in advance. When it has been specified in advance that the preparations for the relay processing at the second processing unit 62 will be completed later than the preparations for the relay processing at the first processing unit 61, the second processing unit 62 does not need to determine whether the preparations for the relay processing at the first processing unit 61 have been completed.

The first processing unit 61 receives the completion signal output from the second processing unit 62. The first processing unit 61 receives a message from the individual ECUs 2 (S08) and outputs the save signal to the second processing unit 62 (S09).

The second processing unit 62 receives the save signal output from the first processing unit 61 and starts saving the messages to be processed at the second processing unit 62 (S10). In more detail, the second processing unit 62 receives messages from the individual ECUs 2 and stores the received messages in the reception buffer 628. Out of the messages stored in the reception buffer 628, the messages stored in the second table T21 are stored by the second control unit 621 as described earlier in the appropriate queue for the relay destination in the transmission queue 629.

By performing relay processing based on the rule table T13 and the third table T12, the first processing unit 61 relays each message that had already been received when the completion signal was received to the individual ECU 2 that is the relay destination (S11), and ends the relay processing based on the rule table T13 and the third table T12 (S12). The first processing unit 61 outputs the transmission signal to the second processing unit 62 (S13), and starts the relay processing based on the rule table T13 and the first table T11 (S14). In more detail, the first processing unit 61 receives messages from the individual ECUs 2. Out of the received messages, each high-priority control message is relayed to the individual ECU 2 that is the relay destination based on the rule table T13 as described earlier. Each low-priority control message is relayed to the individual ECU 2 that is the relay destination based on the first table T11 as described earlier. The table referred to by the first processing unit 61 in performing the relay processing is switched from the third table T12 to the first table T11.

The first processing unit 61 repeats the relay processing based on the rule table T13 and the first table T11, and relays the messages to be processed at the first processing unit 61 out of the messages output from the individual ECUs 2 to the integrated ECU 6.

The second processing unit 62 receives the transmission signal output from the first processing unit 61 and starts transmitting each message to be processed at the second processing unit 62 to the relay destination (S15). Each message described above that has been stored in the transmission queue 629 is relayed to the individual ECU 2 that is the relay destination. The second processing unit 62 starts the relay processing based on the second table T21. The second processing unit 62 repeats the relay processing based on the second table T21 and relays the messages to be processed at the second processing unit 62 out of the messages output from the individual ECUs 2 to the integrated ECU 6.

As another example, when the preparations for the relay processing at the second processing unit 62 are completed earlier than the preparations for the relay processing at the first processing unit 61, the second processing unit 62 completes the preparations for the relay processing and starts the relay processing based on the fourth table T22. The first processing unit 61 completes the preparations for the relay processing and outputs a completion signal to the second processing unit 62. The second processing unit 62 receives the output completion signal. The second processing unit 62 receives messages from the individual ECUs 2 and outputs a save signal to the first processing unit 61. The second processing unit 62 relays the messages that had already been received when the completion signal was received by performing the relay processing based on the fourth table T22, and ends the relay processing based on the fourth table T22. The second processing unit 62 outputs the transmission signal to the first processing unit 61 and starts the relay processing based on the second table T21.

The first processing unit 61 receives the save signal output from the second processing unit 62 and starts saving the messages to be processed at the first processing unit 61. Each message to be processed at the first processing unit 61 is stored in the transmission queue 72 in keeping with the relay destination. The first processing unit 61 receives the transmission signal output from the second processing unit 62 and starts transmitting each message to be processed at the first processing unit 61 to the relay destination.

By outputting the save signal and the transmission signal as described above, it is possible to prevent the first processing unit 61 and the second processing unit 62 from relaying the same message. Also, when switching from a state where only one of the first processing unit 61 and the second processing unit 62 performs relay processing to a state where both the first processing unit 61 and the second processing unit 62 perform relay processing, it is possible for the integrated ECU 6 to prevent the occurrence of non-relayed messages. In other words, it is possible to relay every message with no omissions.

Figure 11:
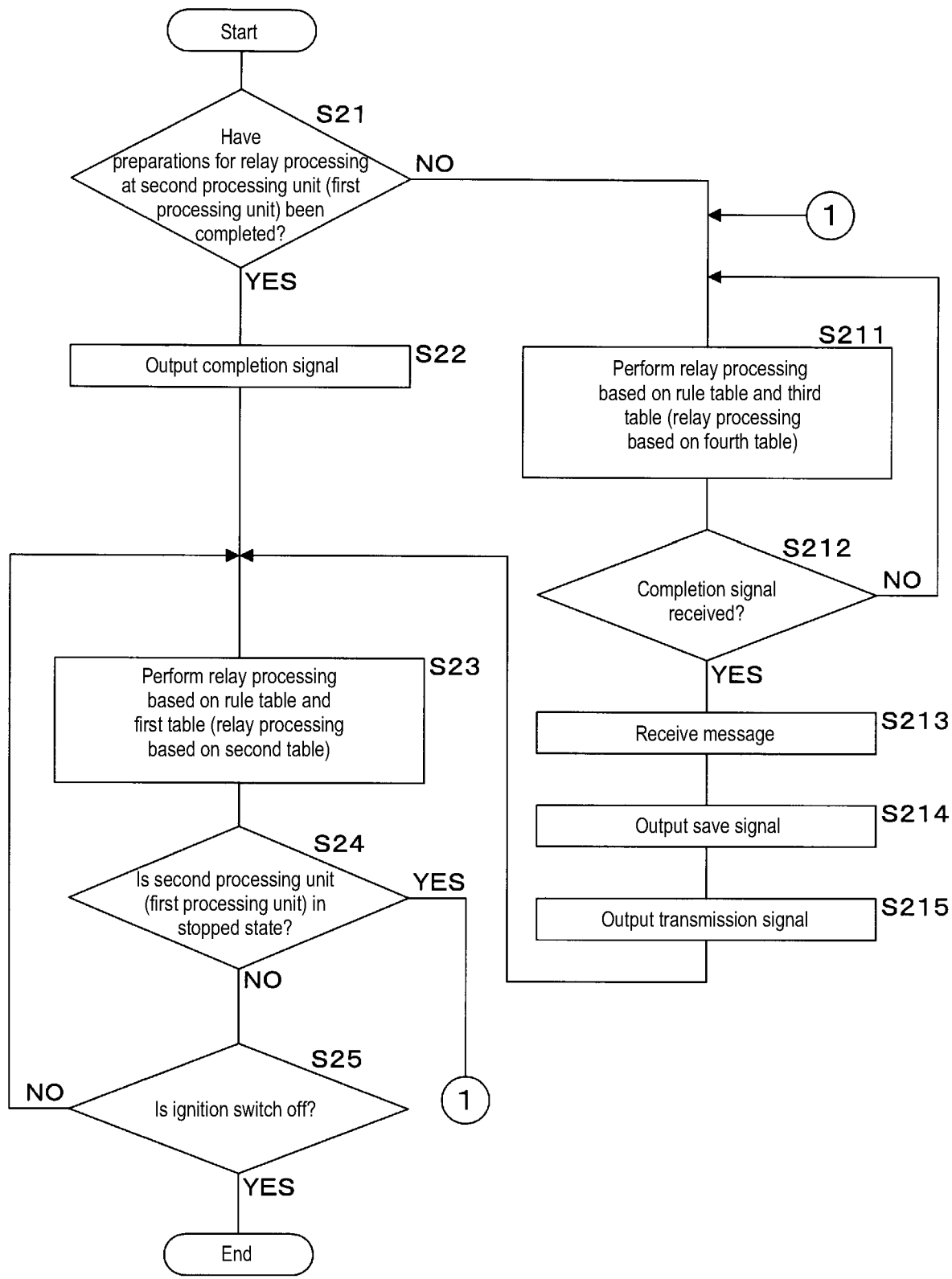
FIG. 11 is a flowchart depicting processing related to relaying of communication performed by a first control unit of a first processing unit.

FIG. 11 is a flowchart depicting processing related to relaying of communication performed by the first control unit 611 of the first processing unit 61. As one example, when the ignition switch is turned from off to on, the first control unit 611 is activated and starts the preparations for the relay processing. When the preparations for the relay processing have been completed, the first control unit 611 performs the processing described below.

The first control unit 611 determines whether the preparations for the relay processing have been completed at the second processing unit 62 (S21). As one example, the first control unit 611 attempts to establish communication between the first processing unit 61 and the second processing unit 62.

When the preparations for the relay processing have not been completed at the second processing unit 62 (S21: NO), the first control unit 611 performs the relay processing based on the rule table T13 and the third table T12 (S211). In more detail, as described earlier, the determination circuit 73 of the HWGW unit 7 specifies the relay destination of each high priority control message based on the rule table T13 and stores that high priority control message in the transmission queue 72 in keeping with the relay destination. The determination circuit 73 outputs each low priority control message and diagnostic message to the first control unit 611. As described earlier, the first control unit 611 specifies the relay destination of each low-priority control message and diagnostic message based on the third table T12, and stores the low-priority control messages and the diagnostic messages in the transmission queue 72 in keeping with the relay destinations. The first control unit 611 has the first communication unit 614 transmit each message stored in the transmission queue 72 to the individual ECU 2 that is the relay destination. One example of when the preparations for the relay processing have not been completed at the second processing unit 62 is when communication has not been established between the first processing unit 61 and the second processing unit 62.

The first control unit 611 determines whether a completion signal has been received from the second control unit 621 (S212). When the completion signal has not been received (S212: NO), the first control unit 611 performs the processing in S211. Accordingly, until the second processing unit 62 has completed the preparations for the relay processing, the first processing unit 61 performs the relay processing for every message output from the individual ECUs 2 connected to the integrated ECU 6.

When the completion signal has been received (S212: YES), the first control unit 611 receives messages (S213) and outputs a save signal to the second control unit 621 (S214). The received messages are relayed by relay processing based on the rule table T13 and the third table T12. After relaying the messages, the first control unit 611 outputs a transmission signal to the second control unit 621 (S215), and performs the processing in S23, described later.

If the second processing unit 62 has completed the preparations for the relay processing (S21: YES), the first control unit 611 outputs a completion signal to the second control unit 621 (S22). The first control unit 611 performs the relay processing based on the rule table T13 and the first table T11 (S23). In more detail, as described above, the determination circuit 73 of the HWGW unit 7 specifies the relay destination of each high priority control message based on the rule table T13, and stores each high priority control message in the transmission queue 72 in keeping with the relay destination. The determination circuit 73 outputs the low priority control messages and the diagnostic messages to the first control unit 611. As described earlier, the first control unit 611 specifies the relay destination of each low-priority control message based on the first table T11, and stores each low-priority control message in the transmission queue 72 in keeping with the relay destination. The first control unit 611 causes the first communication unit 614 to transmit each message stored in the transmission queue 72 to the individual ECU 2 that is the relay destination. When doing so, the first control unit 611 does not specify the relay destinations of the diagnostic messages. The messages to be processed at the first processing unit 61 are relayed. One example of when the second processing unit 62 has completed the preparations for the relay processing is when communication between the first processing unit 61 and the second processing unit 62 is established.

As described earlier, the first control unit 611 determines whether the second processing unit 62 is in the stopped state (S24). When the second processing unit 62 is in the stopped state (S24: YES), the first control unit 611 performs the processing in S211.

When the second processing unit 62 is not in the stopped state (S24: NO), the first control unit 611 determines whether the ignition switch is off (S25). When the ignition switch is off (S25: YES), the first control unit 611 ends the processing. When the ignition switch is not off (S25: NO), that is, when the ignition switch is on, the first control unit 611 performs the processing in S23.

In a flowchart of the processing relating to the relaying of communication performed by the second control unit 621, the expressions "the first processing unit 61", "the rule table T13 and the first table T11", and "the rule table T13 and the third table T12" in the flowchart in FIG. 11 would be replaced with "the second processing unit 62", "the second table T21", and "the fourth table T22". For this reason, detailed description of processing related to the relaying of communication performed by the second control unit 621 is omitted. In FIG. 11, "the second processing unit 62", "the second table T21", and "the fourth table T22" to be substituted for "the first processing unit 61", "the rule table T13 and the first table T11", and "the rule table T13 and the third table T12" are indicated in parenthesis.

Since the integrated ECU 6 uses the first processing unit 61 and the second processing unit 62 to relay communication by the individual ECUs 2, the load of relaying the communication is distributed between the first processing unit 61 and the second processing unit 62. This means the respective loads of the first processing unit 61 and the second processing unit 62 in relaying communication is smaller than when only one of the first processing unit 61 and the second processing unit 62 performs the relay processing. This means that the integrated ECU 6 can efficiently perform the relay processing. The integrated ECU 6 corresponds to a vehicle-mounted apparatus. The individual ECUs 2 correspond to vehicle-mounted ECUs.

As described earlier, high-priority control messages are relayed to the relay destinations by processing within the HWGW unit 7 without their relay destinations being specified by the first control unit 611. Accordingly, the first processing unit 61 can perform relay processing for high priority control messages faster than other types of message. The load placed on the first processing unit 61 by relay processing for high-priority control messages is smaller than relay processing for other types of message.

By having the first processing unit perform relay processing using the HWGW unit 7 when relaying the high-priority control messages, the integrated ECU 6 is compatible with individual ECUs 2 that require high responsiveness and is able to relay communication efficiently. With relay processing where messages are relayed as software processing, it is possible to easily add and change the functions relating to relaying by updating the software. Example additions and changes to the relaying-related functions include additions and changes to the communication protocols relating to the messages to be relayed.

When one of the first processing unit 61 and the second processing unit 62 enters the stopped state, the other of the first processing unit 61 and the second processing unit 62 switches the table it refers to. Even when one of the first processing unit 61 and the second processing unit 62 has entered the stopped state, the integrated ECU 6 is still capable of relaying every message output from the connected individual ECUs 2. This provides redundancy for the relaying of communication at the integrated ECU 6.

For example, when one of the first processing unit 61 and the second processing unit 62 returns from the stop state to the normal state, one out of the first processing unit 61 and the second processing unit 62 may output a completion signal to the other out of the first processing unit 61 and the second processing unit 62. The integrated ECU 6 can then return once again to the state where the first processing unit 61 and the second processing unit 62 perform the relay processing.

As one example, the first control unit 611 and the second control unit 621 may determine whether part of the wiring 65 connecting the individual ECUs 2 and the first processing unit 61 or the second processing unit 62 has become disconnected. As one example, when some of the wiring 65 connecting the individual ECUs 2 and the second processing unit 62 has become disconnected, the first control unit 611 may perform relay processing based on the rule table T13 and the third table T12. As one example, the second control unit 621 may perform no relay processing. In this way, the relaying of communication at the integrated ECU 6 can be provided with redundancy.

As one example, the second processing unit 62 may be configured so that the second communication unit 624 includes the HWGW unit 7. In this case, since both the first processing unit 61 and the second processing unit 62 are equipped with the HWGW unit 7, the integrated ECU 6 can distribute the relaying of high priority control messages between the first processing unit 61 and the second processing unit 62.

As one example, the first processing unit 61 may omit the HWGW unit 7. As one example, in this case, the rule table T13 is stored in the first storage unit 612. The first control unit 611 relays each high priority control message as software processing based on the rule table T13. As one example, out of relaying based on the rule table T13 and relaying based on the first table T11 or the third table T12, the first control unit 611 may preferentially perform the relaying based on the rule table T13. The high-priority control messages may be distributed to the first processing unit 61 and the second processing unit 62 and relayed as software processing.

As described earlier, the table to be referred to during the relay processing is set based on the type of message. Accordingly, the integrated ECU 6 can appropriately perform relay processing in keeping with the type of message. Since the integrated ECU 6 is configured so that the first control unit 611 and the second control unit 621 both relay messages as software processing, the processing loads of the first processing unit 61 and the second processing unit 62 can be distributed. Since the processing loads of the first processing unit 61 and the second processing unit 62 are distributed, in addition to the relay processing, it is possible for the first processing unit 61 and the second processing unit 62 to perform processing aside from relay processing efficiently. As one example, the integrated ECU 6 can have the first processing unit 61 and the second processing unit 62 each freely perform other processing aside from the relay processing.

The first routing table T1 and the second routing table T2 are not limited to the examples described above. As one example, the first table T11 may store some low-priority control messages and some diagnostic messages out of the messages output from the individual ECUs 2. In this case, the remaining low-priority control messages and the remaining diagnostic messages are stored in the second table T21. The first processing unit 61 performs relay processing on the high-priority control messages, some low-priority control messages, and some diagnostic messages. The second processing unit 62 performs relay processing on the remaining low-priority control messages and the remaining diagnostic messages. As one example, the rule table T13 and the first table T11 may be stored in the second storage unit 622 in place of the fourth table T22. For this configuration, the second table T21, the rule table T13, and the first table T11 stored in the second storage unit 622 correspond to the "second routing table T2".

The messages relayed by the HWGW unit 7 and the messages relayed as software processing at the first processing unit 61, and the messages relayed as software processing at the second processing unit 62 are not limited to the examples described above.

As one example, messages relayed by the HWGW unit 7 and messages relayed as software processing may be determined based on ASIL (Automotive Safety Integrity Level) defined in ISO 26262. ASIL expresses the level of safety that must be realized to avoid potential failures in a vehicle-mounted system as one of five levels. ASIL levels are classified into "QM", "ASIL-A", "ASIL-B", "ASIL-C", and "ASIL-D". The QM level is normal quality control where it is not necessary to apply functional safety measures according to ISO 26262. For the levels from ASIL-A to D, it is necessary to apply functional safety measures according to ISO 26262, with the functional safety requirements becoming stricter from ASIL-A to ASIL-D.

In this case, the integrated ECU 6 determines whether a message output from an individual ECU 2 is an ASIL-related message and relays the message in keeping with the determination result. Examples of ASIL-related messages are messages to which one of the ASIL-A to D levels has been assigned. The integrated ECU 6 relays the ASIL-related messages as software processing by the first processing unit 61 or the second processing unit 62. This is because it is necessary to perform processing such as error detection by the first control unit 611 or the second control unit 621 on ASIL-related messages. As one example for this configuration, some ASIL-related messages and relay destinations of these messages are stored in association with each other in the first table T11. The remaining ASIL-related messages and relay destinations of these messages are stored in association with each other in the second table T21.

The integrated ECU 6 uses the HWGW unit 7 to relay messages that are not related to ASIL, such as messages to which the QM level has been assigned and messages to which ASIL has not been assigned. For this configuration, messages that are not related to ASIL and relay destinations of such messages are stored in association with each other in the rule table T13.

All features of the embodiments disclosed here are exemplary and should not be regarded as limitations on the present disclosure. The scope of the present disclosure is indicated by the range of the patent claims, not the description given above, and is intended to include all changes within the meaning and scope of the patent claims and their equivalents.

The invention claimed is:

1. A vehicle-mounted apparatus, which is connected to a plurality of vehicle-mounted Electronic Control Units "ECUs", for relaying messages output by the plurality of vehicle-mounted ECUs, the vehicle-mounted apparatus comprising:
   a first processing unit for performing relay processing on the messages, the first processing unit being connected to each of the plurality of vehicle-mounted ECUs;
   a second processing unit for performing relay processing on the messages, the second processing unit being connected to each of the plurality of vehicle-mounted ECUs;
   a first routing table including a relay destination of each message to be processed at the first processing unit; and
   a second routing table including a relay destination of each message to be processed at the second processing unit,
   wherein each of the first processing unit and the second processing unit includes a connection unit to which wiring connected to the plurality of vehicle-mounted ECUs is connected,
   the first processing unit performs the relay processing based on the first routing table, and
   the second processing unit performs the relay processing based on the second routing table; and
   wherein the first routing table includes the relay destination of each message to be processed at the second processing unit, and
   the first processing unit
   determines whether preparations for the relay processing at the second processing unit have been completed, and performs, when the preparations for the relay processing at the second processing unit have not been completed, the relay processing on the messages to be processed at the first processing unit and the messages to be processed at the second processing unit based on the first routing table.

2. The vehicle-mounted apparatus according to claim 1, wherein the second processing unit:
   outputs, after completion of the preparations for the relay processing, a completion signal indicating the completion of the preparations for the relay processing, and
   starts the relay processing on the messages to be processed at the second processing unit based on the second routing table after the completion signal has been output, and
   the first processing unit starts, when the completion signal has been received, the relay processing on the messages to be processed at the first processing unit based on the first routing table.

3. The vehicle-mounted apparatus according to claim 2, wherein the first processing unit:
   outputs, when a message is received in a state where the completion signal has been received, a save signal, which indicates a start of saving of the messages to be processed, to the second processing unit,
   outputs, after relaying the message received after the completion signal was received, a transmission signal, which indicates a start of transmission of the messages to be processed, to the second processing unit, and
   starts the relaying processing on the messages to be processed at the first processing unit after outputting the transmission signal, and
   the second processing unit
   starts saving the messages to be processed at the second processing unit when the save signal has been received, and
   starts transmission of messages to be processed at the second processing unit to the relay destinations when the transmission signal has been received.

4. The vehicle-mounted apparatus according to claim 1, wherein the first processing unit:
   confirms an operating state of the second processing unit, and
   performs, when the second processing unit is in a stopped state, the relay processing on the messages to be processed at the first processing unit and the messages to be processed at the second processing unit based on the first routing table.

5. The vehicle-mounted apparatus according to claim 1, wherein one of the first processing unit and the second processing unit is equipped with a hardware gateway unit that relays some of the messages, and
   relays other messages out of the messages as software processing, and
   the other of the first processing unit and the second processing unit relays remaining messages out of the messages as software processing.

6. A method for relaying where a vehicle-mounted apparatus, including a first processing unit and a second processing unit that are connected to each of a plurality of vehicle-mounted Electronic Control Units "ECUs" and perform relay processing on messages output by the plurality of vehicle-mounted ECUs, relays the messages, comprising the steps of:

the first processing unit performing the relay processing based on a first routing table including a relay destination of each message to be processed at the first processing unit; and the second processing unit performing the relay processing based on a second routing table including a relay destination of each message to be processed at the second processing unit;

wherein the first routing table includes the relay destination of each message to be processed at the second processing unit, and the first processing unit determines whether preparations for the relay processing at the second processing unit have been completed, and performs, when the preparations for the relay processing at the second processing unit have not been completed, the relay processing on the messages to be processed at the first processing unit and the messages to be processed at the second processing unit based on the first routing table.

7. The method for relaying according to claim 6, wherein a hardware gateway unit provided in one of the first processing unit and the second processing unit relays some messages out of the messages, the one of the first processing unit and the second processing unit relays other messages out of the messages as software processing, and the other of the first processing unit and the second processing unit relays remaining messages out of the messages as software processing.

* * * * *